G. W. MARTIN, W. G. PARRISH & J. A. PETRIE.
Ground Marker and Furrower.
No. 119,628. Patented Oct. 3, 1871.
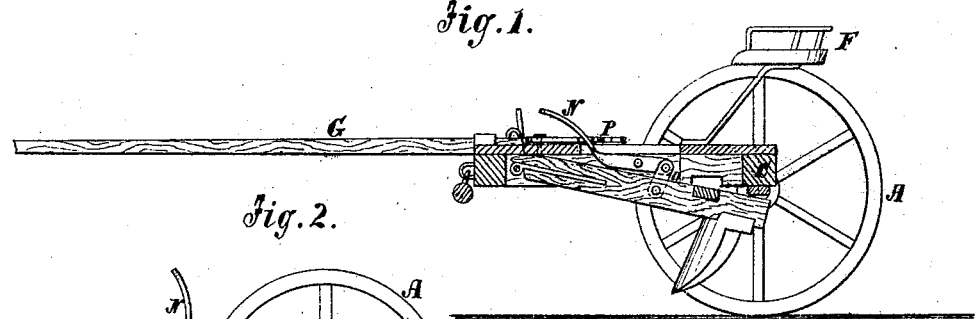
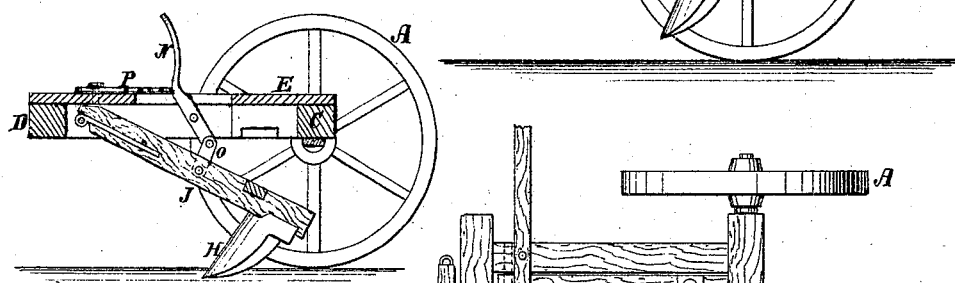
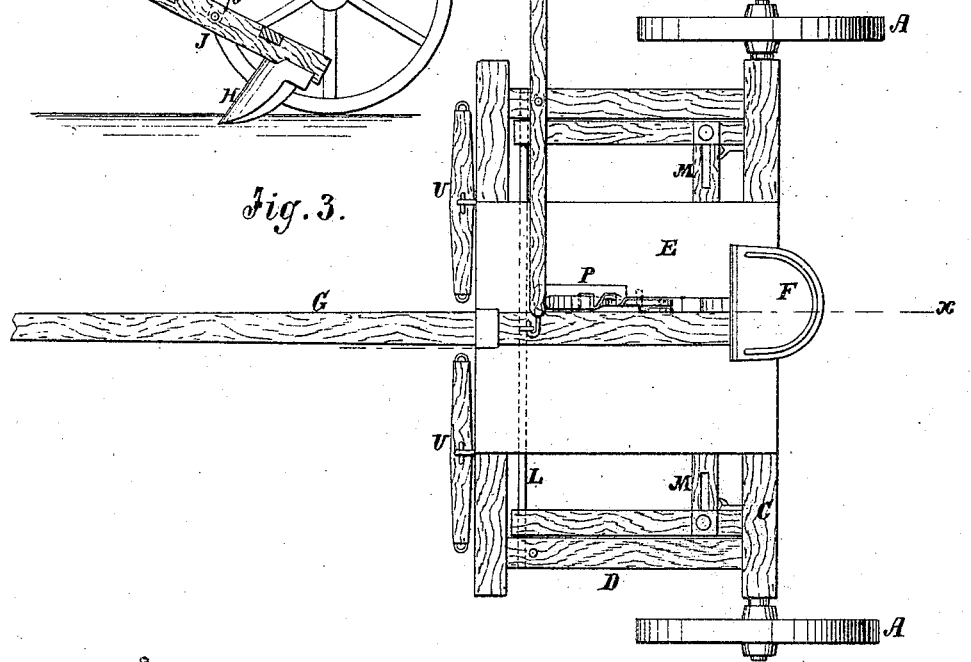
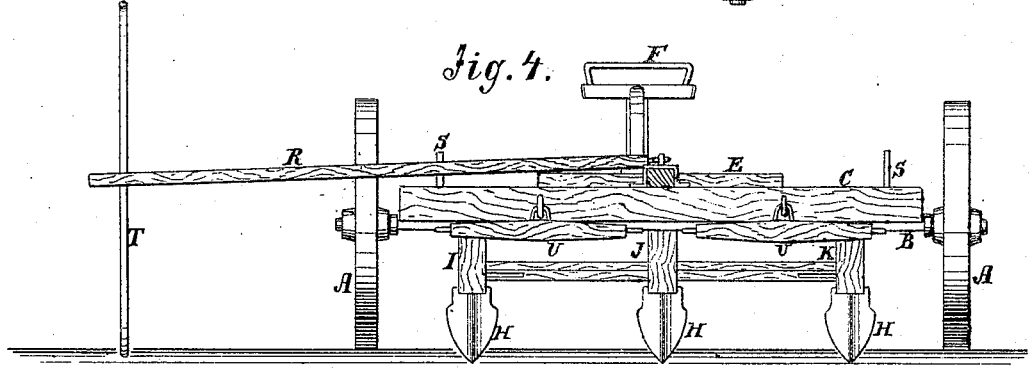
Witnesses:
A. Bennewendorf.
Francis McArdle
Inventor:
G. W. Martin
W. G. Parrish
J. A. Petrie
Per Munn & Co.
Attorneys.

UNITED STATES PATENT OFFICE.

GEORGE W. MARTIN, WILLIAM G. PARRISH, AND JAMES A. PETRIE, OF ELIZABETH, NEW JERSEY.

IMPROVEMENT IN GROUND-MARKERS AND FURROWERS.

Specification forming part of Letters Patent No. 119,628, dated October 3, 1871.

*To all whom it may concern:*

Be it known that we, GEORGE W. MARTIN, WILLIAM G. PARRISH, and JAMES A. PETRIE, of Elizabeth, in the county of Union and State of New Jersey, have invented a new and useful Improvement in Ground-Marker and Furrower; and we do hereby declare that the following is a full, clear, and exact description thereof, which will enable others skilled in the art to make and use the same, reference being had to the accompanying drawing forming part of this specification.

The object of this invention is to furnish to farmers a simple and convenient implement for marking and furrowing land for planting corn, potatoes, and other seeds; and it consists in the arrangement and combination of parts hereinafter described.

In the accompanying drawing, Figure 1 is a vertical longitudinal section of the machine on the line $x\ x$ of Fig. 3. Fig. 2 is a vertical section of Fig. 3, also taken on the line $x\ x$. Fig. 3 is a top or plan view. Fig. 4 is a front view.

Similar letters of reference indicate corresponding parts.

This machine is mounted on two wheels, A A. B is the axle, rigidly attached to the back piece C of the frame D. E is a platform or floor fastened to the top of the frame. F is the driver's seat, supported from the floor. G is the tongue or pole extending across and fastened to the front and back pieces of the frame D. H represents the plows or furrowers, three in number, attached to the rear ends of the beams I, J, and K. The front ends of these beams are hung to the transverse round rod L, which passes through the end pieces of the frame D. M is a transverse bar which is rigidly attached to the center plow-beam J. The other beams I and K are adjustable thereon by means of slots and bolts, so as to vary the width of the furrows from each other for different kinds of seed. Where such adjustment is made the other ends of the beams I and K slide on the rod L. N is a lever which has its fulcrum on the center piece of the frame D, the short end of which lever is connected with the center-beam J by the connecting-plate O. This lever is operated by the foot of the driver, and when pressed down the effect is to raise all the plows from the ground, as seen in Fig. 1. This position is given them in going to or from the field, or when the machine is not in actual use. The lever is held in this position, and in any other desired position to govern the depth of the furrow, by the catch-plate T, which is pivoted to the platform. R is a rod which is hung at one end to the center of the forward part of the frame by a hook and staple, so that it may be reversed and extend in either direction—to the right or left. It is held in position by the pins S S in the frame. T is a marker, the end of which, when placed as seen in the drawing, is in contact with the ground and makes a mark as the machine moves forward, which is a guide to the driver in making the next three furrows, the mark thus made being designed for the center plow and furrow. This machine is designed to be drawn by two horses. U U represents the whiffletrees.

With this machine the ground is furrowed in each direction, the intersections of the furrows being at the proper distance from each other for the rows. Different seeds require planting at different distances apart as well as at different depths in the ground. The plows of this machine being adjustable as to both depth and distance apart, the machine is most admirably adapted for the purposes intended, and is a most valuable labor-saving farm implement.

Having thus described our invention, what we claim as new, and desire to secure by Letters Patent, is—

The beams of the three furrowing-plows, combined, as described, with the same rigid and end-slotted bar M, and the rod L, to which they are pivoted, for the purpose of enabling the two end beams to be adjusted toward or from the central one, and all to be lifted together.

GEORGE W. MARTIN.
WILLIAM G. PARRISH.
JAMES A. PETRIE.

Witnesses:
T. F. McCORMICK,
JOHN EGERN.